INVENTORS.
Paul L. Crenshaw
Floyd F. Flippen
James P. Glasgow
BY
ATTORNEY

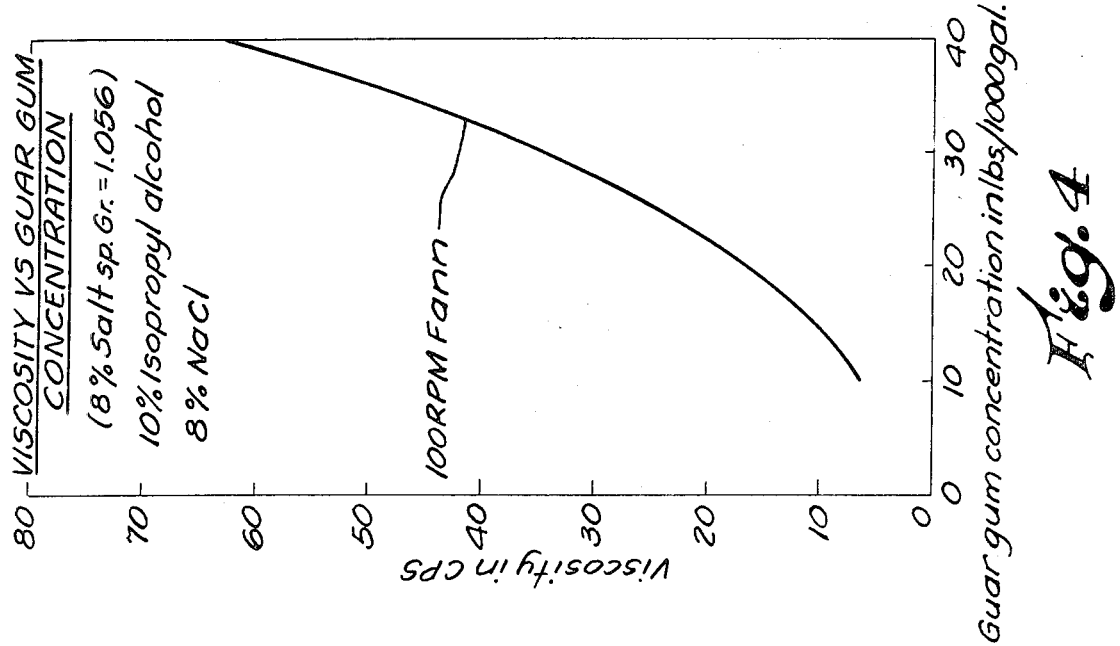
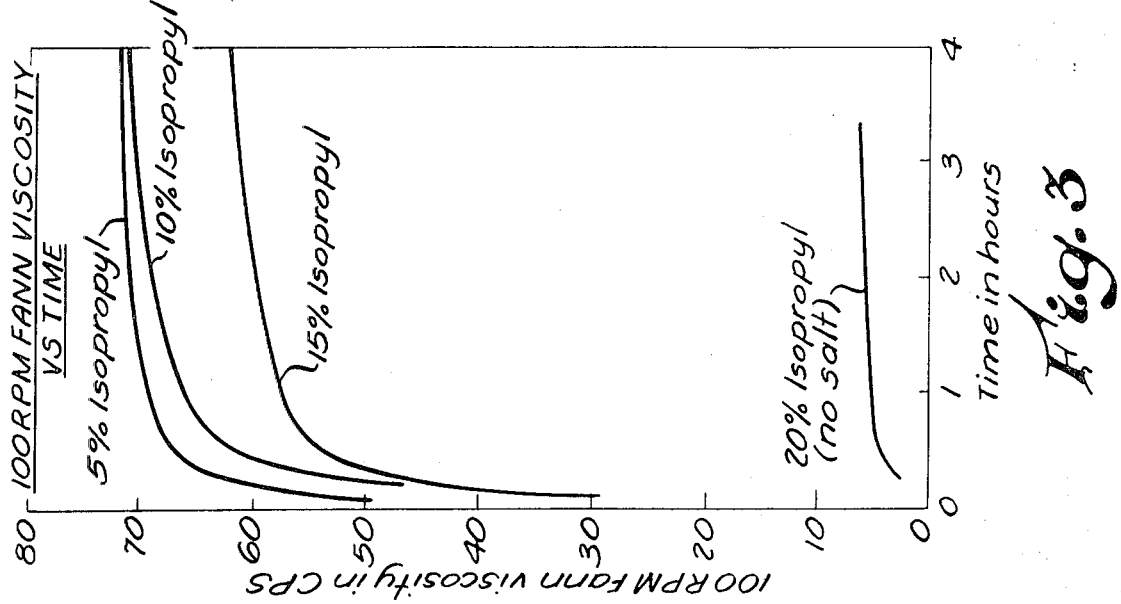

United States Patent Office 3,634,237
Patented Jan. 11, 1972

3,634,237
VISCOUS FLUID COMPOSITIONS
Paul L. Crenshaw and Floyd F. Flippen, Midland, and James P. Glasgow, Houston, Tex., assignors to The Dow Chemical Company, Midland, Mich.
Filed Dec. 15, 1966, Ser. No. 602,079
Int. Cl. E21b 43/26; C09k 3/00
U.S. Cl. 252—8.55 R
7 Claims

ABSTRACT OF THE DISCLOSURE

This invention discloses the use of inorganic alkali metal and alkaline earth metal salts, and alternatively, acids, to effect hydration and subsequent thickening of aqueous alcoholic solutions containing natural gums to provide, e.g., viscous fracturing fluids for use in a method of stimulating production in oil and gas wells.

---

A primary object of the present invention is to provide novel aqueous alcoholic fracturing fluids containing hydrated natural gums as a viscosity imparting agent.

Another primary object of the invention is to provide a rapidly hydrating natural gum-containing aqueous alcoholic fluid.

Another object of the invention is to provide a novel method of hydrating natural gums in aqueous alcoholic solutions.

A further object of the invention is to provide a novel method of preparing aqueous alcoholic fracturing fluids containing hydrated gums as viscosity imparting agents.

Figure 1:
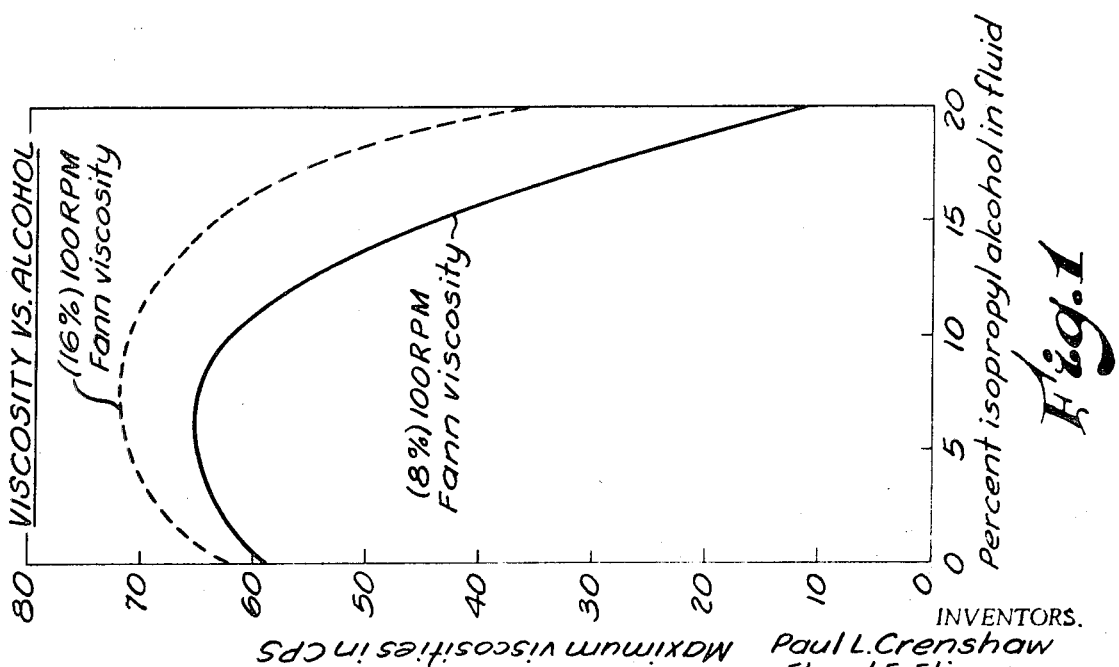

The invention is fully, clearly, and concisely, set forth in the following detailed description and in the multifigured drawing wherein:

FIG. 1 graphically illustrates the effect of various concentrations of isopropyl alcohol on the viscosity of an 8 percent and 16 percent sodium chloride aqueous brine containing guar gum.

Figure 2:
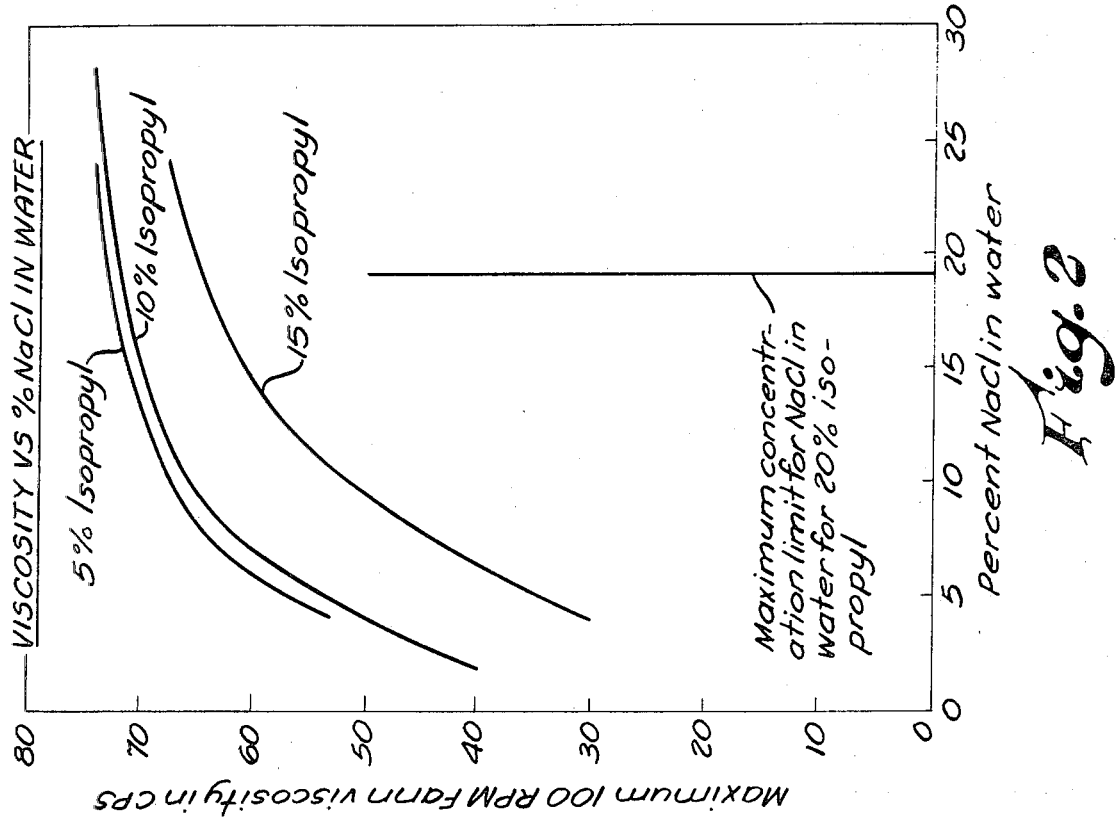

FIG. 2 graphically illustrates the effect of increasing NaCl concentrations on the viscosity of various concentrations of isopropyl alcohol in aqueous solution containing guar gum.

FIG. 3 graphically illustrates the amount of time required to develop various viscosity levels in a fracturing fluid containing 16 percent NaCl in water, isopropyl alcohol, and guar gum, including a blank or comparative illustration showing the effect on viscosity when such a fluid contains no salts.

FIG. 4 graphically illustrates the effect of increasing guar gum concentrations on the viscosity of an aqueous fracturing fluid containing 8 percent NaCl and 10 percent isopropyl alcohol.

In general, the above objects and advantages are obtained in accordance with the present invention in a novel aqueous fluid composition comprising (a) one or more alcohols, (b) a natural gum viscosity imparting agent, (c) one or more inorganic salts, and (d) water as the balance. This novel viscous fluid is useful, e.g., as a fracturing fluid in fracturing earth formations in gas wells to promote higher production of gas therefrom. As an optional additional ingredient, or as an alternative to the inorganic salt component, the fluid composition may include an acid component to provide, among other things, rapid hydration of the viscosity imparting agent, as will be discussed more fully hereinafter. While the present novel viscous fluid may also be used in the stimulation of oil wells, it is employed primarily in the hydraulic fracturing treatments of dry gas wells with aqueous fluids.

Viscosity imparting agent

The viscosity imparting material provides, in conjunction with the other components of the present novel fluid composition, a viscosity of from about 5 to about 200 centipoises. In general, this material comprises one or more natural gums. These gums may be further characterized as natural gums which will hydrate in aqueous fluids in accordance with the present invention containing the aforesaid alcohol component, inorganic salts, and/or acids to provide a viscosity in said fluids of from about 5 to about 200 centipoises. Said gums include, e.g., galactomannans such as, e.g., guar gums, gum ghatti, gum acroides, gum tragacanth, gum karaya, and soy flour extract, galactomannans and gum tragacanth being preferred.

Guar gums are gums derived from the seeds of the guar plant as a crude polysaccharide. They are normally available as dry powders containing about 75 percent by weight of a D galacto-D-mannoglycon and about 25 percent by weight of fat, fiber, protein, ash and moisture. The glycon is a straight chain mannin having single membered galactose branches and is therefore classified as a galactomannan. The D-galactopyranose units in the chain are joined to one another by beta-1,4 linkages. The gum has a molecular weight of about 220,000.

Other galactomannan gums having similar chemical compositions which may be used in the invention include those derived from the shells of the ivory nut palm, from the seeds of the flame tree, from the seeds of the tara plant, and from the seeds of the locust bean.

In fracturing fluids in accordance with the present invention containing various inorganic salts, these gums are unexpectedly readily hydrated, especially upon agitating, to provide gelling sufficient to impart to the fracturing fluid the viscosities necessary for the fracturing treatment.

In general, the amount of gum employed in the present fluid composition must be sufficient to impart thereto a viscosity broadly limited as a maximum only by pumpability. Normally, an amount of gum to impart a viscosity to the composition of from about 5 to about 200 centipoises is used. Specific amounts by weight are disclosed in the examples which follow hereinafter. A preferred viscosity for fracturing is from about 10 to about 100 centipoises. In general, from about 0.05 to about 0.10 percent by weight of the gum component will be employed in the present invention.

Alcohol component

Substantially water miscible aliphatic alcohols are used as the alcohol component. Operable members include for examples the lower molecular weight alcohols having from 1 to 4 carbon atoms, including methyl, ethyl, propyl, isopropyl and butyl alcohol, said alcohols being employed either singly or in combination. Of the alcohols recited, isopropyl alcohol and methyl alcohol are preferred.

The operable and preferred amounts of the alcohols to be used in the novel fracturing fluid composition of the present invention are as follows:

|  | Percent— | |
|---|---|---|
|  | Operable | Preferred |
| Methyl | 5–25 | 10–20 |
| Ethyl | 5–25 | 10–20 |
| Propyl | 5–25 | 10–20 |
| Isopropyl | 2–25 | 10–20 |
| Butyl | 2–25 | 5–15 |

The amounts of alcohol recited are in precent by weight of the fracturing fluid, using commercially pure alcohols. Combinations of alcohols may also be used in a total amount of about 25 percent.

Alcohol is a desirable additive in fluids used for well stimulation as it lowers the surface tension of the water and thereby aids in clean-up following stimulation of the well. Moreover, the alcohol does not "plate out" (i.e., deposit out) on the formation but stays in solution. If alcoholic aqueous fracturing fluids come in contact with formation water or oil, the alcohol will tend to diffuse into these other liquids and reduce their surface tension. This ability to diffuse into other liquids and not deposit on the formation apparently is one reason why the viscous fracturing fluid is effective. Use of alcohols in fracturing is particularly desirable as aforesaid in treating dry gas wells because the volatility of the alcohol allows it to be picked up and carried by the produced gas. Moreover, the alcohol carries the water out of the hole with it, significantly lowering the residual fluid saturation in the reservoir, resulting in greater gas productivity.

While the use of alcohols is desirable in the fracturing fluids for the reasons described, heretofore natural gums could not be employed therein to impart the necessary viscosity needed for fracturing, since gelling of the fluid was limited. Accordingly, the present invention provides for and permits the use of alcoholic fracturing fluids containing gums since the needed fluid viscosity may now be obtained by the use of inorganic salts and/or acids as hereinafter described.

The salt component of the present fluid composition provides for the ready hydration of the gum component to an extent where suitable viscosities for fracturing are obtained as defined hereinbefore. Such viscosities are not obtained in aqueous alcoholic-gum mixtures alone. For

Inorganic salt component example, guar gum in fresh water containing alcohol produces a viscosity less than about 10 percent of the viscosity obtained in a similar aqueous mixture but containing sodium chloride.

The inorganic salts which may be used in the present invention include the alkali metal and alkaline earth metal when economically available, and calcium chloride behalide salts, e.g., sodium chloride, potassium chloride being preferred. The actual salt employed depends for the most part on economics and availability.

In general, the amount of the salt component used will be within an operable range of from about 5 to about 30 weight percent, and preferably from about 10 to about 26 weight percent of dry salt based on the weight of the water component. In dilute aqueous, alcoholic, gum mixtures in accordance with the present invention the amount of salt employed is in a linear proportion with the alcohol component amount, i.e., as more alcohol is employed, more salt may be employed. In more concentrated mixtures, however, the maximum amount of salt which may be employed is limited by the maximum solubility of the salt component in the concentrated aqueous alcohol. Optimum salt-alcohol proportions may be readily predetermined. Examples of specific salt-alcohol proportions which may be employed in the present invention are disclosed in the examples which follow hereinafter.

The balance of the novel fluid composition of the invention is water and is employed in an amount, with the other components, to provide for hydration of the gum component and a suitable viscosity for fracturing. Normally, the water employed in the fracturing fluid is introduced by way of a solution with the salt component either as an artificially prepared or naturally occurring brine. Accordingly, the present invention permits the use of natural brine waters in fracturing fluid which were heretofore avoided in stimulation treatments of dry gas wells, thus comprising another advantage of the present invention.

Optional additional or alternative ingredient

As an optional additional ingredient to the alcohol, gum and brine mixture, or, as an alternative ingredient in place of the aforesaid inorganic salt component, from about 1 to about 15 percent of an acid is employed capable in aqueous solution of hydrating the gum component. Normally the acid may be selected from the group consisting of hydrochloric acid, sulfamic acid, citric acid, formic acid, acetic acid, hydrofluoric acid, and mixtures of these acids. Among the reasons for using such an acid is that it acts as a "breaking" agent in breaking up the gel for easier removal of the fracturing fluid from the stimulated well. In addition, a small amount of acidizing of the well formation through the perforations in the well casing takes place. A primary advantage of using the acid component, however, resides in being able to prepare the present fracturing fluid by a continuous mixing technique, that is, continuous concurrent admixing by metering and mixing the individual components simultaneously, as opposed to batch mixing. Continuous mixing has the advantage of ease in preparation and in time savings. Among the disadvantages of employing the acid is that lower ultimate viscosities result and faster breakdown of the gelled fracturing fluid. Accordingly, use of the acid as an optional ingredient will depend on the ultimate fracturing viscosities needed, and the time available for fracturing.

Preparation of fluid composition

In formulating the novel fracturing fluid of the present invention, the method to be employed may comprise admixing as in a batch the alcohol and salt and/or acid components into fresh water, or admixing the alcohol and/or acid into an aqueous natural brine, said natural aqueous brine having an inorganic salt concentration in accordance with the invention, all three (alcohol, salt, acid) components being employed in predetermined amounts to provide, with the natural gum component, the necessary viscosity in a fracturing fluid for well stimulation.

To this admixture, the gum component is added by stirring and the complete mixture agitated for a period of time sufficient to solubilize the gum. Normally, a period of at least about 1 to about 4 hours is needed, except when acid is used, to obtain or approach maximum viscosity in the composition batch. The gelled, viscous fracturing fluid is then introduced into the well by pumping to accomplish fracturing and stimulation of the well.

A preferred method of preparing the present novel fracturing composition in order to obtain very rapid hydration of the natural gum component and gelling of the composition comprises first dissolving the gum component in a salt brine, or in an aqueous acidic solution, or in a mixture thereof, whereupon the alcohol component is added and the entire mixture agitated until the gum is essentially all solubilized and the composition is substantially homogeneous. The advantage obtained is in the rapid hydration of the gums. This technique of mixing together with the use of the optional acid component provides for even more rapid hydration times of the gum component.

The present novel invention provides a useful fracturing fluid for stimulating, e.g., dry gas wells, and contrary to previous practice, permits the use of relatively inexpensive natural gums as viscosity imparting agents in aqueous alcoholic solutions. The viscosity obtained particularly with the preferred gums, permits further the use of solids as propping agents with the fracturing fluids and easier pumping of said fluids.

The following examples serve to illustrate the present invention more fully but are not to be construed as limiting the invention thereto in any way.

EXAMPLE 1

In accordance with the present invention, 100,000 gallons of a fracturing fluid was prepared in a batch comprising 30,000 gallons of fresh water, 60,000 gallons of brine, and 10,000 gallons of isopropyl alcohol, technical grade, all mixed together into a single solution. The brine comprised approximately 26 percent sodium chloride. In general, the fracturing fluid was prepared in a number of 20,000-gallon capacity tanks located at a gas well site. A mixture of the alcohol and brine components from said tanks was pumped through blenders wherein a guar gum was added as a dry powder at a rate of about 40 pounds per 1,000 gallons of alcohol-brine mixture. After the total of fracturing fluid was formulated and blended into a homogeneous quantity for from 2 to 4 hours, the fluid was pumped through the blender again where 20 to 40 mesh sand was added as a propping agent at a rate of from about ½ to about 1¾ pounds sand per gallon of the gelled fracturing fluid, whereupon the fluid-sand mixture was passed through a battery of high pressure pumps (2200 to 4500 p.s.i.g.) and into the well head. The rate of addition of sand was increased over a 4-stage sequence, with intermediate insertions of 1" diameter ball sealers, during a 1-hour pumping period. The approximate viscosity of the fracturing fluid as it entered the well head was about 70 centipoises, and the pumping rate was about 46 barrels per minute.

The completed fracturing job using the fracturing fluid of the present invention was successful in that the new well was properly stimulated to a greater production rate of 10.8MM c.f.d., measured two weeks after treatment. The gas well fractured in this example had been acidized by conventional techniques just prior to fracturing in accordance with the invention and was located in Crockett County, Tex. The depth of the formation fractured ranged from about 5900 to about 6400 feet.

The gas well treated in this example resulted in a better producer than numerous adjacent or offset wells (best offset well potentialed 6.8MM c.f.d.) treated with other type fracturing fluids not within the scope of the present invention. Moreover, the well so stimulated returned the fracturing fluid load significantly faster and more completely than any other of said adjacent wells, thus indicating the highly operable and desirable nature of the fracturing fluids of the present invention. The well returned about 66 percent of the load in one week and eventually returned about 90 percent of the load within three weeks. Other conventional fracturing jobs in adjacent wells in this same field returned an ultimate load of from 50 to 70 percent in three to four weeks.

EXAMPLE II

The gas well fractured in this example was located in Eddy County, N. Mex., and was fractured over a formation depth of from about 10,260 feet to about 10,375 feet. The "frac" fluid prepared and employed herein comprised 15 percent by volume of isopropyl alcohol, 42.5 percent by volume of so-called potash water brine containing 2½ percent by weight of potassium chloride with greater amounts of $CaCl_2$ and NaCl, 42.5 percent by volume of a 2 percent aqueous HCl solution (as the optional additional component of the present invention), and 40 pounds of guar gum per 1000 gallons of the alcohol-brine mixture. The fracturing fluid was prepared substantially as set forth in Example 1. Propping agents employed in this example included 8000 pounds of 20 to 40 mesh sand and 1800 pounds of 12 to 20 mesh glass beads. The viscosity of the fluid as it entered the well head was about 45 centipoises. As in Example 1, the gas well so-treated was successfully stimulated to greater production as evidenced by the fact that before this treatment the well was producing about 40M c.f.d, whereas 20 days after the treatment, the well was producing 1000M c.f.d. Essentially all the load was recovered within 4 days after said treatment.

EXAMPLE III

Referring now to the drawing, the figures therein present and show the effect on viscosity by the various components of the fracturing fliud of the present invention as follows using the "Standard Procedure for the Evaluation of Hydraulic Fracturing Fluids" according to the American Petroleum Institute bulletin RP-39:

FIG. 1 is a graphic illustration of the effect of various concentrations of alcohol (isopropyl) on the viscosity of an 8 percent and a 16 percent sodium chloride aqueous brine, showing that the viscosity of these "frac" fluids in accordance with the invention containing guar gum increases with increasing alcohol concentrations to a maximum of about 10 percent alcohol, whereup on the viscosity decreases rather rapidly. The frac fluid contained an amount equivalent to 40 pounds of guar gum per 1000 gallons of total solution. All viscosity readings were made about 4 hours after the various mixtures were prepared.

FIG. 2 is a graphic illustration of the effect of increasing NaCl concentrations on the viscosity of various concentrations of isopropyl alcohol aqueous solutions containing an amount equivalent to 40 pounds of guar gum per 1000 gallons of total solution, showing that the viscosity of the fluid increases as the salt concentration increases to a maximum point where the viscosity levels off to a fairly constant level. All viscosity measurements were made about 4 hours after the various mixtures were prepared.

FIG. 3 is a graphic illustration of the amount of time required for development of a desirable viscosity in a "frac" fluid containing 16 percent NaCl in water with varying isopropyl alcohol concentrations and an amount equivalent to 40 pounds of guar gum per 1000 gallons of total solution. In particular, it shows the desirability of using 5 to 15 percent isopropyl alcohol to increase the gelling rate of the gum in the fluid.

Also illustrated in FIG. 3 is a control or blank as a 5 percent isopropyl aqueous solution containing no salt but containing an amount of guar gum equivalent to 40 pounds of gum per 1000 gallons of fluid. The blank shows that alcoholic "frac" fluids which do not contain a salt have a very low viscosity, thus showing little thickening effect, thus hardly no advantage in using guar gum therein.

FIG. 4 is a graphic illustration of the effect of increased gum concentrations on the viscosity of an aqueous "frac" fluid containing 8 percent NaCl and 10 percent isopropyl alcohol, as measured using a 100 r.p.m. reading of a Fann Viscosimeter, thereby providing a means of predetermining the ultimate viscosity of gum-containing "frac" fluids.

The present invention may be modified or changed without departing from the spirit or scope thereof and the invention is only limited as defined in the following claims.

We claim:

1. A hydraulic aqueous fracturing fluid consisting essentially of: an amount by weight of a natural gum material as a viscosity imparting agent to provide when hydrated a viscosity of from about 5 to about 200 centipoises in said fracturing fluid; at least one substantially water-miscible aliphatic alcohol selected from the class consisting of from about 5 to about 25 percent by weight of said fracturing fluid of methyl, ethyl or propyl alcohol, or from about 2 to about 25 percent by weight of said fracturing fluid of isopropyl, or butyl alcohol, and an inorganic alkali metal or alkaline earth metal halide salt, the balance being essentially water, said salt being in an amount of from about 5 to about 30 percent based on the weight of water in the fracturing fluid.

2. The fracturing fluid of claim 1 wherein the natural gum material is a galactomannan.

3. The fracturing fluid of claim 1 including as an additional component, from about 1 to about 15 percent of at least one acid capable in aqueous solution of hydrating said natural gum, selected from the class consisting of hydrochloric acid, sulfamic acid, citric acid, formic acid, acetic acid, hydrofluoric acid, and mixtures thereof.

4. In a method of stimulating wells with a viscous aqueous hydraulic fracturing fluid, the improvement comprising introducing into said well under fracturing pressure a fluid composition consisting essentially of an amount by weight of a natural gum as a viscosity imparting agent to provide when hydrated a viscosity in said fluid composition of from about 5 to about 200 centipoises; from about 5 to 20 percent by weight of the fracturing fluid of a substantially water-miscible aliphatic alcohol selected from the class consisting of methyl, ethyl, propyl, isopropyl, and butyl alcohol, and mixtures thereof, and inorganic alkali metal or alkaline earth metal halide salt, the balance being essentially water, said salt being in an amount of from about 5 to about 30 percent based on the weight of water in the fracturing fluid.

5. The improved method of claim 4 wherein the natural gum is a galactomannan.

6. The improved method of claim 4 wherein the fracturing fluid includes as an additional component, from about 1 to about 15 percent of at least one acid capable in aqueous solution of hydrating said natural gum, selected from the class consisting of hydrochloric acid, sulfamic acid, citric acid, formic acid, acetic acid, hydrofluoric acid, and mixtures thereof.

7. The improved method of claim 6 wherein the acid is aqueous hydrochloric acid.

References Cited
UNITED STATES PATENTS

| | | | |
|---|---|---|---|
| 3,153,450 | 10/1964 | Foster et al. | 252—8.55 X |
| 3,238,141 | 3/1966 | Gatza | 252—8.55 X |
| 3,256,181 | 6/1966 | Zingg et al. | 252—8.55 |
| 3,408,296 | 10/1968 | Kuhn et al. | 252—8.55 |

HERBERT B. GUYNN, Primary Examiner

U.S. Cl. X.R.

166—307, 308; 252—8.55 C